Nov. 5, 1946.  A. R. McGARVEY  2,410,586
LAMINATED MATERIALS
Filed Nov. 28, 1940

Inventor
Alex. R. McGarvey
by
Walter T. Kaufman
Attorney

Patented Nov. 5, 1946

2,410,586

UNITED STATES PATENT OFFICE 2,410,586

LAMINATED MATERIALS

Alan R. McGarvey, Lancaster, Pa., assignor to Armstrong Cork Company, Lancaster, Pa., a corporation of Pennsylvania Application November 28, 1940, Serial No. 367,504

7 Claims. (Cl. 154—40)

This invention relates to laminated materials and to processes of making them.

In laminating materials, a simple rubber dispersion, such as latex, may be used, but the use of such a dispersion alone, requires the use of great pressures to produce a satisfactory adhesive bond between the sheets of material being laminated. Adhesives have been made by mixing rubber dispersions with hydraulic cements, but such mixtures start to set as soon as they are mixed and would coagulate immediately unless stabilized by the addition of considerable amounts of protective colloids, such as casein. The presence of considerable amounts of such protective colloids detracts materially from the flexibility and resilience of the bond. The necessity, in the former case, to use great pressure is a serious disadvantage in that it entails an undesirably high capital investment in equipment specially adapted to function properly under high stresses. Similarly, the reduced flexibility and resilience of the bond resulting where large amounts of protective colloids are used with the rubber dispersion and hydraulic cement mixture is a serious disadvantage, especially when the products are of such a nature that high flexibility and resilience are ordinarily required. This is particularly true of such materials as laminated woven or felted fabrics.

This application concerns novel laminated materials and novel methods of utilizing a mixture of a rubber dispersion and hydraulic cement as the bonding layer without the use of additional stabilizers to prevent the rapid coagulation of the dispersion by the hydraulic cement. The bonding materials of the application are also adaptable to procedures in which the use of great pressure is to be avoided. Again, this procedure is especially advantageous with relation to the manufacture of laminated woven and felted fabrics, since excellent adhesion is obtained without the use of excessive pressures.

Figure 1:
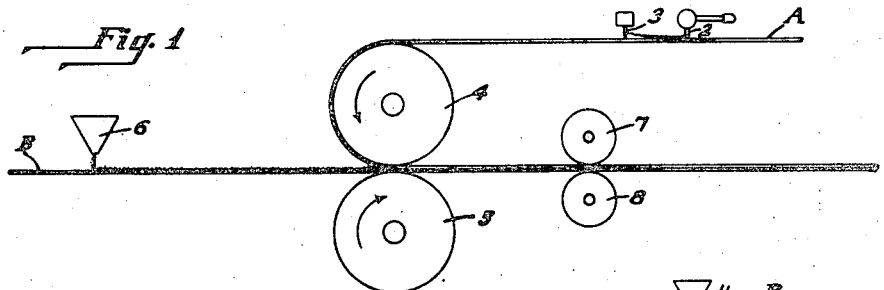
Figure 1 is illustrative of one embodiment of the invention.

Essentially, the procedure employed in this invention comprises the bringing of two materials in the form of blocks or sheets having definite surfaces to be adhesively joined to one another into contact and the bringing together of a rubber dispersion and a hydraulic cement substantially at the point or line of contact between the two materials. In this way, the setting and coagulating of the two components of the adhesive occurs substantially simultaneously with the pressing together of the two or more materials being laminated. This is highly important in that the mixture of the two components of the adhesive has no opportunity to lose adhesiveness by virtue of coagulation and setting before the two sheets of material being laminated are pressed into contact with the adhesive. This result may be accomplished in numerous ways. For example, the powdered hydraulic cement may be sprayed, dusted, or otherwise coated upon the surface of one of the materials to be laminated, while the rubber dispersion may be brushed, sprayed, or otherwise coated upon the surface of the other material to be adhered to that of the first sheet, and then the two sheets may be run with their coated surfaces opposed between two rolls or other pressure-exerting devices. In addition, either one or both of the components, namely, the dispersion or the powdered cement, may be sprayed or dusted or otherwise flowed between the two opposed faces of the materials being laminated at the point or line of contact of the two materials where they are pressed together by the rolls or other pressure devices.

One component of the adhesive of this invention consists of a dispersion of rubber, gutta percha, or balata, or of synthetic rubber-like substances, which may be either natural or artificially produced. In addition, aqueous dispersions of thermoplastic or thermosetting resins of adhesive character, such as asphalt, phenol-formaldehyde, or urea-formaldehyde resins may be employed instead of the rubber dispersion. In the specification hereinafter and in the claims, this component will be referred to generally as "an aqueous dispersion of an adhesive resin."

The other component of the adhesive comprises essentially a material capable of combining with the water of the aqueous dispersion. In the specification and in the claims, such a material will be generally referred to hereinafter as "a hydraulic-setting cement." Examples of such materials are lime, Portland cement, aluminous cement, gypsum, plaster of Paris, magnesium oxychloride cement, etc.

Vulcanizing agents may be employed in the rubber dispersion, or they may be mixed with the powdered cement, the latter procedure being especially advantageous when the agent or agents, such as anti-oxidants, accelerators, and ultra-accelerators, that are employed are solids capable of being powdered.

The amounts of the respective components that may be employed may be varied within a wide range. However, the most satisfactory results have been obtained by the use of from 9 to 12 or more grams of rubber dispersion (having a rubber content of about 65%) and from about 2.8 to 3.5 grams of hydraulic cement per square foot of area to be adhesively joined. Obviously, the ratios between the rubber dispersion and the cement depend upon the concentration of the dispersion and the particular character of the cement employed in any particular case. It is preferable that the two components be so proportioned that the water of the dispersion is substantially entirely eliminated by the setting of the cement, that is, by the combining of the cement therewith. Since each particular cement has a particular combining ratio with water, it is obvious that a different proportion of each cement should be employed to combine with the amount of water present in any given rubber dispersion.

The laminating procedure described in this application may be employed in conjunction with any suitable materials, such as plywood, wood veneering, paper, fabrics, urea-formaldehyde resin bonded jute fiber sheets, felt, asphalt-saturated felt, and it may be used to combine materials of the same character or materials of different character, such as paper with cardboard, paper with fabric, felt with plywood, felt with felt, and the like. It may also serve to adhere floor and wall covering materials of all sorts to concrete, plaster, wood, or any other floor or wall surface. It has been found to be especially valuable in laminating sheets of asphalt-saturated felt to produce panel boards, used in the fabrication of doors and walls of automobiles and the like. With such asphalt-saturated felt, latex alone has little adhesiveness and would require high pressure which tends to break down the felt. For reasons stated above, the use of a mixture of hydraulic cement and a rubber dispersion stabilized with considerable amounts of additional protective colloids produces a product having a relatively inflexible bond. However, by employing the procedure of this invention, the panel material resulting from the lamination of asphalt-saturated felt is highly flexible and adherent, the bonding layer acting as a rubbery hinge permitting free flexing action in all directions.

In Figure 1, one of the sheets A to be laminated passes beneath a row of nozzles 2 through which the rubber dispersion is applied, then passes a doctor blade 3 which spreads the dispersion uniformly over the sheet, and then passes over one of a pair of rolls 4 and 5, in the nip of which it comes in contact with a surface of a second sheet B previously coated by a powdered hydraulic cement falling from the hopper 6. The pair of rolls 4 and 5 presses the two sheets together, after which the laminated material may, if desired, be passed through an additional pair of calendering rolls 7 and 8. From the calendering rolls, the material may be run into festooning devices or upon a wind-up roll. The festooned or rolled material may be permitted to set at ordinary temperatures or it may be subjected to controlled humidity at elevated temperatures to accelerate the setting. Obviously, the process may be made continuous by placing the festooning devices in a tunnel in which temperature and humidity conditions are properly controlled and running the laminated material continuously through the devices. Such devices are conventional and form no part of this invention.

Figure 2:
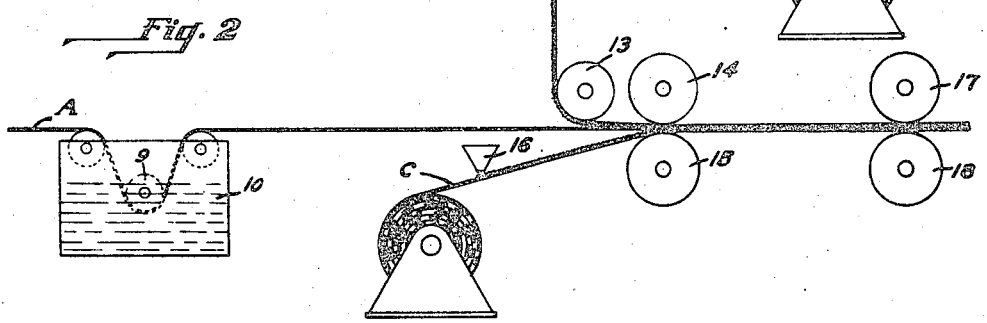
Figure 2 is illustrative of an embodiment in which three layers of material make up the laminated unit.

Figure 2 illustrates an embodiment in which three sheets A, B, and C of asphalt-saturated felt are laminated. In this figure, the central sheet A runs under a roller 9 immersed in a bath 10 consisting of a rubber dispersion so that the sheet is coated on both sides with the dispersion, and then passes between the coated faces of the other two sheets B and C. The upper sheet B is dusted with hydraulic cement beneath the hopper 11 and passes over idler rolls 12 and 13 into the nip of the pressure rolls 14 and 15 while the lower sheet C is coated with hydraulic cement from the hopper 16 and passes into the nip of the pressure rolls 14 and 15 so as to contact the opposite surface of the central sheet A coated with rubber dispersion. As in the preceding figure, the laminated material may pass between a second pair of calendering rolls 17 and 18, if desired. When smooth sheets, such as of paper, wood, etc., are employed, the rolls can be arranged to give the several layers a vertical course at the place of their juncture, and to give the two outer layers horizontal courses up to the place of juncture so that the cement does not fall off the smooth surface before the several layers are joined.

Figure 3:
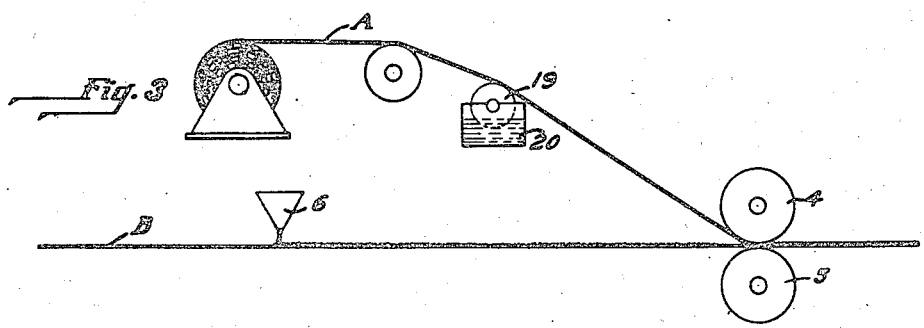
Figure 3 is illustrative of a modification of the method employed in Figure 1.

Figure 3 illustrates a modification of the procedure employed in Figure 1 in which the rubber dispersion is applied by means of the wetted surface of a roller 19 which runs in a bath 20 of the dispersion.

Figure 4:
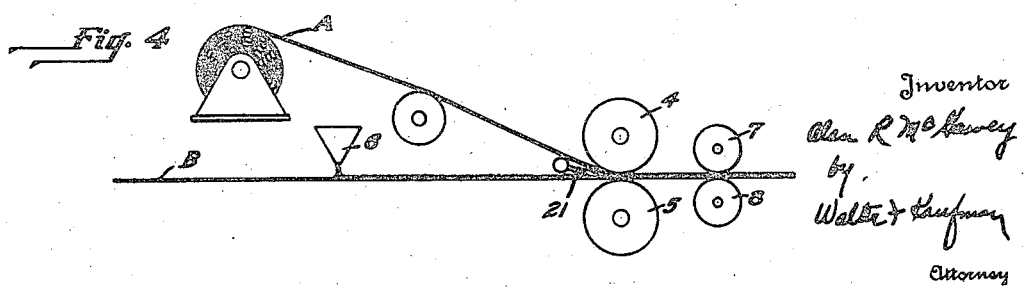
Figure 4 is illustrative of a second modification of the procedure illustrated in Figure 1.

Figure 4 shows a further modification of the procedure employed in Figure 1 in which the rubber latex is sprayed between 21 between the two sheets at the point of contact between the pair of pressure rolls 4 and 5. As in the preceding figures, the hydraulic cement is applied by means of a hopper 6. Again, a second pair of calendering rolls 7 and 8 may be employed.

Obviously, the above figures suggest other modifications which may be employed to obtain the same results. For example, in Figure 4, the hydraulic cement may also be sprayed between the two sheets to be laminated at the point of their contact between the pressure rolls. Similarly, in any of the cases of applying the rubber dispersion by means of nozzles, as illustrated in Figure 2 or 4, a single slot-like nozzle stretching across the sheet may be employed instead of a plurality of individual nozzles or individual openings stretching across the sheet.

While the invention has been disclosed in terms of specific examples employing certain materials, the description is intended to be merely illustrative. It is obvious that various modifications may be made without departing from the spirit of the invention and it is to be understood that this invention is limited only by the appended claims.

I claim:

1. In the method of producing laminated materials by pressing together at least two sheets of asphalt-saturated felt with a bonding material therebetween comprising two components, the one component comprising an aqueous rubber dispersion and the other component comprising a hydraulic-setting cement, the steps of applying one of said components to at least one surface of one of said sheets; applying the other of said components to at least one surface of the other of said two sheets and then pressing said sheets together with their coated faces opposed to form and activate said bonding material by bringing together for the first time said dispersion and said hydraulic-setting cement.

2. In the method of producing laminated materials by pressing together at least two sheets of material with a bonding material therebetween comprising two components, the one component comprising an aqueous rubber dispersion and the other component comprising a hydraulic-setting cement, the steps of applying one of said components to at least one surface of one of said sheets; applying the other of said components to at least one surface of the other of said two sheets and then pressing said sheets together with their coated faces opposed to form and activate said bonding material by bringing together for the first time said dispersion and said hydraulic-setting cement.

3. In the method of producing laminated materials by pressing together at least two sheets of material with a bonding material therebetween comprising two components, the one component comprising an aqueous dispersion of a water-insoluble adhesive and the other component comprising a hydraulic-setting cement, the steps of applying one of said components to at least one surface of one of said sheets; applying the other of said components to at least one surface of the other of said two sheets and then pressing said sheets together with their coated faces opposed to form and activate said bonding material by bringing together for the first time said dispersion and said hydraulic-setting cement.

4. In the method of producing laminated materials by pressing together at least two sheets of material with a bonding material therebetween comprising two components, the one component comprising an aqueous dispersion of a resinous adhesive and the other component comprising a hydraulic-setting cement, the steps of applying one of said components to at least one surface of one of said sheets; applying the other of said components to at least one surface of the other of said two sheets and then pressing said sheets together with their coated faces opposed to form and activate said bonding material by bringing together for the first time said dispersion and said hydraulic-setting cement.

5. In the method of producing laminated materials by pressing together along a line at least two sheets of asphalt-saturated felt with a bonding material therebetween comprising two components, the one component comprising an aqueous rubber dispersion and the other component comprising a hydraulic-setting cement, the steps of continuously applying one of said components to at least one surface of one of said sheets and then progressively bringing the other component together with said first component between the opposed surfaces of said sheets for the first time to form and activate the bonding material substantially at the line of application of said pressing.

6. In the method of producing laminated materials by pressing together along a line at least two sheets of material with a bonding material therebetween comprising two components, the one component comprising an aqueous dispersion of a water-insoluble adhesive and the other component comprising a hydraulic-setting cement, the steps of continuously applying one of said components to at least one surface of one of said sheets and then progressively bringing the other component together with said first component between the opposed surfaces of said sheets for the first time to form and activate the bonding material substantially at the line of application of said pressing.

7. In the method of producing laminated materials by pressing together along a line at least two sheets of material with a bonding material therebetween comprising two components, the one component comprising an aqueous dispersion of a resinous adhesive and the other component comprising a hydraulic-setting cement, the steps of continuously applying one of said components to at least one surface of one of said sheets and then progressively bringing the other component together with said first component between the opposed surfaces of said sheets for the first time to form and activate the bonding material substantially at the line of application of said pressing.

ALAN R. McGARVEY.